US006309504B1

(12) United States Patent

Langan

(10) Patent No.: US 6,309,504 B1

(45) Date of Patent: Oct. 30, 2001

(54) METHOD OF LABELING BLOW MOLDED ARTICLES WITH LINEAR LABELS

(75) Inventor: Joseph W. Langan, Cheektowaga, NY (US)

(73) Assignee: Moore Business Forms, Inc., New York ( * ) Notice: Subject to any disclaimer, the term of this patent is extended or adjusted under 35 U.S.C. 154(b) by 333 days.

(21) Appl. No.: 08/876,030

(22) Filed: Jun. 12, 1997

Related U.S. Application Data

(62) Division of application No. 08/653,231, filed on May 24, 1996, now Pat. No. 5,904,968.

(51) Int. Cl.[7] .................................................... B32B 31/00

(52) U.S. Cl. ......................... 156/278; 156/281; 156/321; 427/208

(58) Field of Search .................................... 156/278, 321, 156/281; 427/208

(56) References Cited

U.S. PATENT DOCUMENTS 2,435,267 * 2/1948 Cahn .................................... 156/321

5,518,762 * 5/1996 Soltysiak et al. .................... 156/278

FOREIGN PATENT DOCUMENTS 5-221438 * 8/1993 (JP) ...................................... 156/321

* cited by examiner

*Primary Examiner*—John J. Gallagher

(74) *Attorney, Agent, or Firm*—Nixon & Vanderhye PC

(57) ABSTRACT

Paper stock (e.g. about 3 mils thick) is highly calendered to form a paper label substrate having first and second faces, with indicia imaged on the first face, a coating of adhesive release material over the imaged indicia, and a pressure sensitive adhesive on the second face. The release coating may be silicone release coating, and the adhesive permanent acrylic adhesive. The paper stock label substrate desirably has a moisture content of between about 6–8%, the release coat and adhesive sealing the moisture within the paper stock. The pressure sensitive adhesive is applied to a blow molded plastic article while the article has a temperature of above 120° F. The article is cooled so that the label conforms to the surface of the article without visible flaws (such as lifted edges, air bubbles, or puckering).

18 Claims, 2 Drawing Sheets

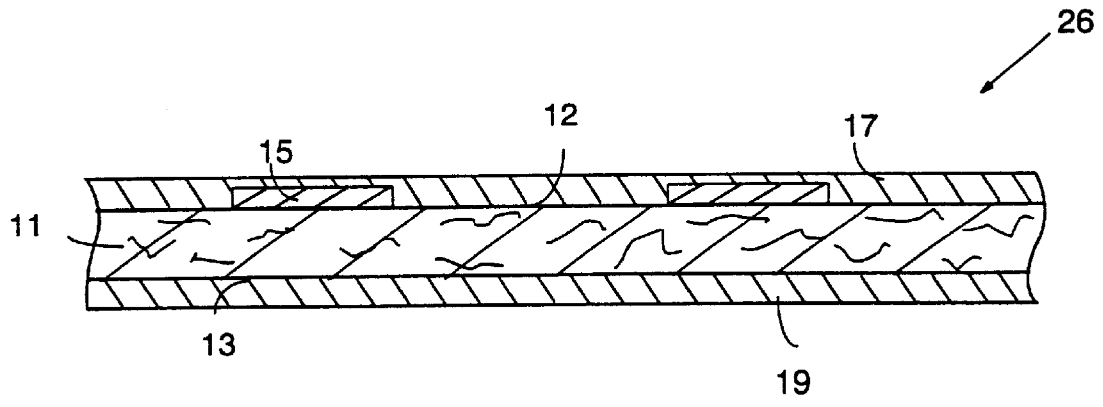
FIG. 2
FIG. 3
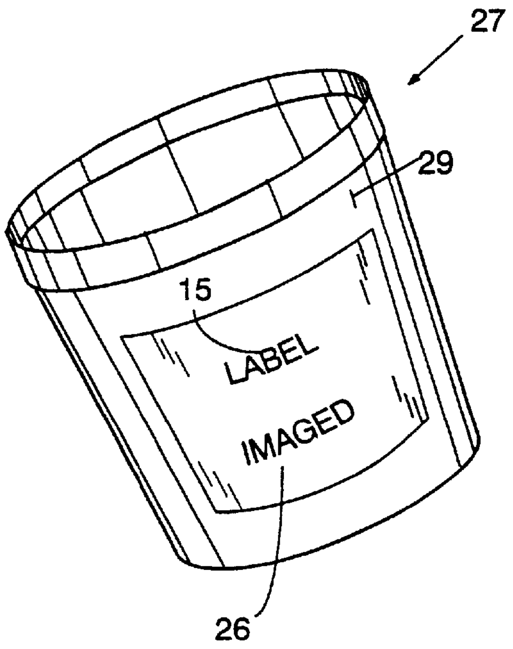

METHOD OF LABELING BLOW MOLDED ARTICLES WITH LINEAR LABELS

This is a divisional of application Ser. No. 08/653,231, filed May 24, 1996 now U.S. Pat. No. 5,904,968.

BACKGROUND AND SUMMARY OF THE INVENTION

It is common practice to label blow molded plastic articles in order to provide information to consumers of the articles, and in an aesthetically pleasing manner. The labels provide product identification information, and also may contain indicia promoting the product. The common commercial method for such labeling is to use a polyvinyl chloride label substrate having adhesive on one face which is covered by a release sheet. The plastic surface may be constructed of various curvatures depending on the shape and diameter of the mold. Plastic articles are produced by coating a mold with a release agent, and then injecting hot plastic (in liquid form) into the blow mold to create a molded plastic article (e.g. a planter, refuse container, dish tray, or almost an infinite variety of other types of articles). Once the product is molded it is removed from the blow molding equipment, typically at a temperature between about 160–180° F. The plastic product identification label is then hand applied to the finished unit while the article is still hot (e.g. at a temperature up to 160° F.). The article then cools down, causing the plastic material to contract. The pressure sensitive label must conform properly to the product during the cooling process and remain adhered with no visible flaws (such as lifted edges, air bubbles, or puckering). While this technique is effective, polyvinyl chloride is not very environmentally friendly, so that a more acceptable alternative is needed.

U.S. Pat. No. 4,729,864 teaches a method of forming plastic containers that have labels that may be made out of paper rather than plastic. In this method the paper label has a heat activated adhesive and is placed inside the blow mold itself. The heat from a parison, and the pressure generated by the blow medium, binds the label onto the blown container sidewall. However, unless the moisture of the label is controlled, the rate of shrinkage of the label is different than the plastic sidewall of the blow molded article so that the label does not adhere properly. Therefore, it is necessary to use a label that has been specifically acted on so that it has a moisture level of between about 6–8%. This procedure is complicated, requiring integration of the label with the blow molding process rather than applying the label to a final product.

U.S. Pat. No. 5,238,720 shows another method of labeling a molded article. However, here too the label is added to the mold, the label having a two layer construction including a base portion molded to the actual blow molded article, with a removable second layer. The second layer may comprise a latex impregnated paper.

According to the present invention, a method of labeling a blow molded plastic article, a label for application to a blow molded plastic article, and a method of making and using a label are provided which allow the effective labeling of blow molded articles in an environmentally friendly manner, that does not require placing the label in the mold. Rather, the label according to the present invention, which is of paper stock, may be applied directly to a surface of the blow molded article, e.g. while it is still hot, yet when the article with label cools the label conforms to the surface of the article without visible flaws (i.e. without lifted edges, air bubbles or puckering).

According to one aspect of the present invention a label, ideally suited for application to a blow molded plastic article, is provided. The label comprises the following components: a highly calendered paper stock label substrate having first and second faces, indicia imaged on the first face; an adhesive release coat on the first face and a pressure sensitive adhesive on the second face.

The paper stock label substrate preferably has a thickness of between about 2–4 mil, e.g. about 3 mil. Also, the label substrate preferably has a moisture content of between about 6–8%, the adhesive release coat and the pressure sensitive adhesive sealing the moisture within the paper stock label substrate so that even if the label is applied hot to the article it has a suitable rate of shrinkage so that visible flaws do not form in the label in the final label product. The adhesive may be a permanent acrylic adhesive, while the release coat is a silicone release coat. The label may be in roll form with a plurality of other labels, the adhesive from one contacting the release coat of others, and the release coat may be provided over the imaged indicia. Imaging may also be provided on the second face of the label stock, covered by the pressure sensitive adhesive, particularly in situations where the article is transparent or translucent so that the indicia on the second face may be read from the exterior of the article even with the label applied to the article.

According to another aspect of the present invention, a method of labeling a blow molded plastic article using a paper label having a first printed face having an adhesive release coating, and a second face having pressure sensitive adhesive, is provided. The method comprises the following steps: (a) Blow molding, in a mold, an article having a first surface for receiving a label by introducing heated plastic into the mold. (b) Removing the article from the mold while the article is still in heated condition. (c) Applying the paper label to the article while the article is still in heated condition with the pressure sensitive adhesive contacting the first surface of the article, and the release coated first face of the label facing away from the article. And (d) cooling the article, so that the label conforms to the first surface of the article without visible flaws.

Steps (b) and (c) are preferably practiced with the "heated condition" at a temperature of over 120° F. (e.g. between 150–160° F.). The label preferably is as described above, with permanent acrylic adhesive applied directly to the article first face, and with the paper stock having a moisture content of between about 6–8% which is sealed therein by the release coat and the adhesive.

According to another aspect of the present invention a method of making and using a label is provided comprising the following steps: (a) Highly calendering paper stock to form a paper label substrate having first and second faces. (b) Imaging a first face of the substrate. (c) Coating the first face of the substrate with adhesive release material. (d) Coating the second face of the substrate with pressure sensitive adhesive. And (e) applying the pressure sensitive adhesive to a first surface of an article so that the adhesive sticks to the first surface without visible flaws.

Step (e) may be practiced by applying the pressure sensitive adhesive to a blow molded plastic material while the article has a temperature of above 120° F., and the label may have the construction as described above. Steps (a) through (e) may be practiced sequentially, although other sequences are also possible, such as applying the adhesive release material before imaging, or applying the pressure sensitive adhesive simultaneously with or before application of the release coat, etc.

It is a primary object of the present invention to provide for the effective labeling of blow molded plastic articles, the labels when applied to the articles having no visible flaws, and being environmentally friendly. This and other objects of the invention will become clear from an inspection of the detailed description of the invention and from the appended claims.

BRIEF DESCRIPTION OF THE DRAWINGS

FIG. 2 is an enlarged cross sectional view of an exemplary label according to the present invention; and FIG. 3 is a blow molded article with the label of FIG. 2 applied thereto, having no visible flaws, according to the invention.

DETAILED DESCRIPTION OF THE DRAWINGS

Figure 1:
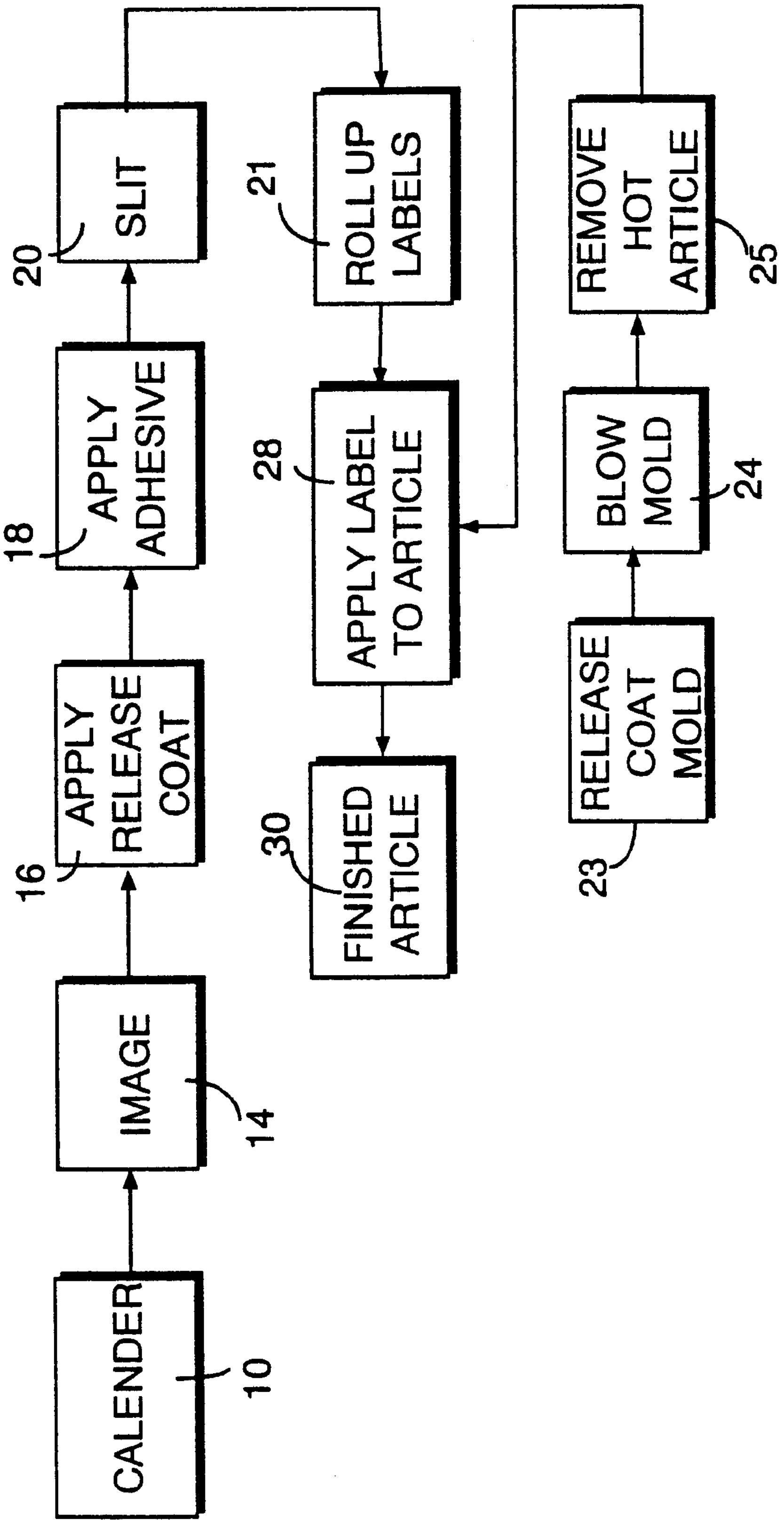
FIG. 1 is a schematic diagram illustrating exemplary method steps that may be practiced according to an exemplary method of the present invention.

FIG. 1 schematically illustrates an exemplary method for making and using a fineness label according to the present invention. As indicated at 10, paper stock is highly calendered to preferably produce the substrate 11 of FIG. 2. For example, the calendered paper stock 11 may be, or equivalent to, a Nicolate 2–4 mil (e.g. about 3 mil) thick substrate, which is commonly used as a release liner. The substrate 11 has a first face 12 and a second face 13. The substrate 11 preferably while in web form, is imaged as indicated at block 14 in FIG. 1. Preferably the face 12 is imaged, producing imaged indicia shown schematically at 15 in FIG. 2 on the face 12. At stage 14 the second face 13 may also be imaged if the label to be produced to be used with a transparent article.

After imaging at stage 14, which may be accomplished utilizing any suitable imaging equipment such as an impact printer, electrostatic printing, or the like, the web of material has a release coat applied as indicated at stage 16. The release coat—shown at 17 in FIG. 2—is any conventional adhesive release material, such as a silicone release material. The release coat 17 is preferably applied over the imaged indica 15. Subsequently, adhesive is applied to the second face 13 as indicated at block 18 in FIG. 1. The adhesive is shown at 19 in FIG. 2. Preferably the adhesive 19 is a permanent acrylic adhesive such as National Starch 38-4549.

As indicated by block 20 in FIG. 1, the web which includes the substrate 11 with the coats 17, 19, is then slit with conventional automatic slitting equipment, and then typically rolled up as indicated at 21 in FIG. 1. The web may be rolled up without a release liner, since the adhesive 19 will not stick to the adhesive release material 17. After rolling at stage 21 the roll of linerless labels may be transported to a location where they will be applied to blow molded articles.

FIG. 1 also schematically illustrates the construction of blow molded articles. As indicated at block 23 in FIG. 1, a mold is coated with a release coat material. Plastic is heated so that it is in liquid form, and introduced into the blow mold as indicated at stage 24 in FIG. 1. The article formed by blow molding at stage 24 is then removed from the mold while still hot (e.g. at a temperature between 160–180° F.) as illustrated at 25 in FIG. 1.

It is highly desirable for effective production and for other reasons to apply the labels produced at stage 21, and shown schematically in final form at 26 in FIG. 2 and FIG. 3, while the article 27 (see FIG. 3) is at a temperature between 150–160° F., or at least over about 120° F. The label 26 is applied directly to the article 27 as indicated at stage 28 in FIG. 1. The adhesive 19 is applied to a surface 29 of the article 27, producing the finished article as indicated at stage 30, the finished article being the combination of the article 27 with the label 26 applied as illustrated in FIG. 3.

The paper substrate 11 is preferably produced so that it has a moisture content of between about 6–8%. Because the release coat 17 and the adhesive 19 have been applied thereto the moisture is "sealed" within the substrate 11 so that it maintains the moisture content of between about 6–8% even once applied to the hot article 27. As a result, the label 26 cools so that it has no visible flaws (that is without lifted edges, bubbles, or puckering), so that the indicia 15 on the label 26 is readily readable to provide consumer information and/or advertising.

It will thus be seen that according to the present invention a method of making and using a linerless label, particularly in the labeling of a blow molded plastic article, has been provided, as well as a particularly advantageous paper label for application to a blow molded plastic article. While the invention has been herein shown and described in what is presently conceived to be the most practical preferred embodiment, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A method of making and using a label, comprising the steps of:

(a) highly calendering paper stock to form a paper label substrate having first and second faces;

(b) imaging a first face of the substrate;

(c) coating the first face of the substrate with adhesive release material;

(d) coating the second face of the substrate with pressure sensitive adhesive; and (e) applying the pressure sensitive adhesive to a first surface of an article so that the adhesive sticks to the first surface without visible flaws.

2. A method as recited in claim 1 wherein step (e) is practiced by applying the pressure sensitive adhesive to a blow molded plastic article while the article has a temperature of above 120° F.

3. A method as recited in claim 2 wherein the paper stock from step (a) has a moisture content of between about 6–8%, and wherein steps (c) and (d) are practiced to seal the paper stock so that it retains a moisture content of between about 6–8%.

4. A method as recited in claim 2 wherein steps (a)–(e) are practiced sequentially, and wherein step (a) is practiced to provide paper stock with a thickness of about 3 mil, and wherein (c) is practiced to coat the paper stock first face with silicone release material, and wherein step (d) is practiced to coat the paper stock second face with permanent acrylic adhesive.

5. A method as recited in claim 1 wherein the paper stock from step (a) has a moisture content of between about 6–8%, and wherein steps (c) and (d) are practiced to seal the paper stock so that it retains a moisture content of between about 6–8%.

6. A method as recited in claim 3 wherein steps (a)–(e) are practiced sequentially, and wherein step (a) is practiced to provide paper stock with a thickness of about 3 mil, and wherein (c) is practiced to coat the paper stock first face with silicone release material, and wherein step (d) is practiced to coat the paper stock second face with permanent acrylic adhesive.

7. A method as recited in claim 1 wherein steps (a)–(e) are practiced sequentially, and wherein step (a) is practiced to provide paper stock with a thickness of about 3 mil, and wherein (c) is practiced to coat the paper stock first face with silicone release material, and wherein step (d) is practiced to coat the paper stock second face with permanent acrylic adhesive.

8. A method as recited in claim 1 wherein step (a) is practiced to provide paper stock with a thickness of between 2–4 mils.

9. A method as recited in claim 8 wherein step (e) is practiced by applying the pressure sensitive adhesive to a blow molded plastic article while the article has a temperature of above 120° F.

10. A method as recited in claim 9 wherein the paper stock from step (a) has a moisture content of between about 6–8%, and wherein steps (c) and (d) are practiced to seal the paper stock so that it retains a moisture content of between about 6–8%.

11. A method as recited in claim 1 comprising the further step of removing a blow molded plastic article from a blow mold while the article is at a temperature of between about 160–180° F.; and wherein step (e) is practiced by applying the pressure sensitive adhesive of the label to the article while the article is at a temperature of between above 120° F. to about 160° F.

12. A method as recited in claim 11 wherein step (e) is practiced while the article is at a temperature of between 150–160° F.

13. A method as recited in claim 11 wherein the paper stock from step (a) has a moisture content of between about 6–8%, and wherein steps (c) and (d) are practiced to seal the paper stock so that it retains a moisture content of between about 6–8%.

14. A method as recited in claim 11 wherein steps (a)–(e) are practiced sequentially, and wherein step (a) is practiced to provide paper stock with a thickness of about 3 mil, and wherein (c) is practiced to coat the paper stock first face with silicone release material, and wherein step (d) is practiced to coat the paper stock second face with permanent acrylic adhesive.

15. A method as recited in claim 1 comprising the further step of removing a blow molded plastic article from a blow mold while the article is still hot; and wherein step (e) is practiced by applying the pressure sensitive adhesive of the label to the blow molded plastic article while the article has a temperature of above 120° F. to about 160° F.

16. A method as recited in claim 15 wherein step (e) is practiced while the article is at a temperature of between 150–160° F.

17. A method as recited in claim 15 wherein the paper stock from step (a) has a moisture content of between about 6–8%, and wherein steps (c) and (d) are practiced to seal the paper stock so that it retains a moisture content of between about 6–8%.

18. A method as recited in claim 15 wherein steps (a)–(e) are practiced sequentially, and wherein step (a) is practiced to provide paper stock with a thickness of about 3 mil, and wherein (c) is practiced to coat the paper stock first face with silicone release material, and wherein step (d) is practiced to coat the paper stock second face with permanent acrylic adhesive.

* * * * *

UNITED STATES PATENT AND TRADEMARK OFFICE
CERTIFICATE OF CORRECTION

PATENT NO. : 6,309,504 B1
DATED : October 30, 2001
INVENTOR(S) : Langan

It is certified that error appears in the above-identified patent and that said Letters Patent is hereby corrected as shown below:

<u>Column 3,</u>
Line 22, "fineness" should be -- linerless --;
Line 26, "Nicolate" should read -- Nicolet --.

Signed and Sealed this

Twelfth Day of March, 2002

*Attest:*

*Attesting Officer*

JAMES E. ROGAN
*Director of the United States Patent and Trademark Office*

UNITED STATES PATENT AND TRADEMARK OFFICE

CERTIFICATE OF CORRECTION

PATENT NO. : 6,309,504 B1
DATED : October 30, 2001
INVENTOR(S) : Langan

It is certified that error appears in the above-identified patent and that said Letters Patent is hereby corrected as shown below:

Title page,
Item [*] Notice, delete "333" and insert -- 718 --.

Signed and Sealed this

Eighth Day of July, 2003

JAMES E. ROGAN
*Director of the United States Patent and Trademark Office*